(12) United States Patent
Kim et al.

(10) Patent No.: US 12,744,231 B2
(45) Date of Patent: Sep. 22, 2026

(54) BATTERY PACK ASSEMBLY GUIDE JIG

(71) Applicant: LG ENERGY SOLUTION, LTD., Seoul (KR)

(72) Inventors: Young-Jin Kim, Daejeon (KR); Yong-Shik Shin, Daejeon (KR); Do-Wung Son, Daejeon (KR); Seung-Hyun Yun, Daejeon (KR); Byeong-Yoon Jung, Daejeon (KR); Sung-Man Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 776 days.

(21) Appl. No.: 18/018,016

(22) PCT Filed: Oct. 13, 2021

(86) PCT No.: PCT/KR2021/014150
§ 371 (c)(1),
(2) Date: Jan. 25, 2023

(87) PCT Pub. No.: WO2022/080872
PCT Pub. Date: Apr. 21, 2022

(65) Prior Publication Data
US 2023/0282868 A1 Sep. 7, 2023

(30) Foreign Application Priority Data
Oct. 13, 2020 (KR) ........................ 10-2020-0131940

(51) Int. Cl.
*H01M 10/04* (2006.01)
*H01M 50/244* (2021.01)
*H01M 50/258* (2021.01)

(52) U.S. Cl.
CPC ..... *H01M 10/0404* (2013.01); *H01M 50/244* (2021.01); *H01M 50/258* (2021.01)

(58) Field of Classification Search
CPC ........... H01M 10/0404; H01M 50/209; H01M 50/262; H01M 50/258
See application file for complete search history.

(56) References Cited

U.S. PATENT DOCUMENTS

2013/0108909 A1* 5/2013 Matsuo ................ H01M 50/211 429/100
2018/0277803 A1 9/2018 Park et al.
(Continued)

FOREIGN PATENT DOCUMENTS

CN 104218196 A 12/2014
CN 110062970 A 7/2019
(Continued)

OTHER PUBLICATIONS

KR 20140087780 A Transation (Year: 2014).*
(Continued)

*Primary Examiner* — Niki Bakhtiari
*Assistant Examiner* — Ryan K. Blackwell-Rudasill
(74) *Attorney, Agent, or Firm* — Birch, Stewart, Kolasch & Birch, LLP

(57) ABSTRACT

A battery pack assembly guide jig for guiding an assembly of a battery pack having a case tray and a case cover is provided. The battery pack assembly jig includes a first guide configured to temporarily fix a first side edge of the case tray and a first side edge of the case cover, and a second guide spaced apart from the first guide by a predetermined distance and configured to temporarily fix a second side edge of the case tray opposite the first side edge of the case tray and a second side edge of the case cover opposite the first side edge of the case cover. The battery pack assembly guide jig is configured to support the case tray and the case cover of the battery pack when the case tray and the case cover are coupled to each other.

11 Claims, 13 Drawing Sheets

(56) References Cited

U.S. PATENT DOCUMENTS

| | | | |
|---|---|---|---|
| 2018/0309101 | A1 | 10/2018 | Nakai et al. |
| 2019/0305270 | A1 | 10/2019 | Chi et al. |
| 2020/0227704 | A1 | 7/2020 | Kim et al. |
| 2020/0287182 | A1 | 9/2020 | Kong et al. |
| 2020/0303697 | A1 | 9/2020 | Kim et al. |
| 2020/0381684 | A1 | 12/2020 | Jin et al. |
| 2021/0242526 | A1 | 8/2021 | Jang et al. |

FOREIGN PATENT DOCUMENTS

| | | | | | |
|---|---|---|---|---|---|
| CN | 210668600 | U | | 6/2020 | |
| CN | 211182395 | U | | 8/2020 | |
| JP | 2013-54982 | A | | 3/2013 | |
| JP | 2015-149147 | A | | 8/2015 | |
| JP | 2016-225153 | A | | 12/2016 | |
| JP | 2018-120679 | A | | 8/2018 | |
| JP | 2019-507947 | A | | 3/2019 | |
| KR | 10-0494491 | B1 | | 6/2005 | |
| KR | 20140087780 | A | * | 7/2014 | ........ H01M 10/0404 |
| KR | 10-1481250 | B1 | | 1/2015 | |
| KR | 10-2016-0050849 | A | | 5/2016 | |
| KR | 10-2017-0141517 | A | | 12/2017 | |
| KR | 10-2019-0045723 | A | | 5/2019 | |
| KR | 10-2019-0127056 | A | | 11/2019 | |
| KR | 10-2043115 | B1 | | 11/2019 | |
| KR | 10-2019-0136228 | A | | 12/2019 | |
| WO | WO 2007/039801 | A1 | | 4/2007 | |
| WO | WO 2020/141942 | A1 | | 7/2020 | |

OTHER PUBLICATIONS

Extended European Search Report for European Application No. 21880519.0, dated Oct. 18, 2024.

International Search Report (PCT/ISA/210) issued in PCT/KR2021/014150, dated Jan. 27, 2022.

* cited by examiner

BATTERY PACK ASSEMBLY GUIDE JIG

TECHNICAL FIELD

The present disclosure relates to a battery pack assembly guide jig, and more particularly to, a battery pack assembly guide jig to guide the assembly of a battery pack.

The present application claims priority to Korean Patent Application No. 10-2020-0131940 filed on Oct. 13, 2020 in the Republic of Korea, the disclosures of which are incorporated herein by reference.

BACKGROUND ART

Secondary batteries that have high ease of application according to product groups and have electrical characteristics such as high energy density, etc. are universally applied to not only portable devices, but also electric vehicles (EVs) or hybrid vehicles (HEVs) driven by an electric drive source. These secondary batteries are attracting attention as a new energy source for improving eco-friendliness and energy efficiency in that not only the primary advantage of being able to dramatically reduce the use of fossil fuels but also the fact that no by-products are generated from the use of energy.

The types of secondary batteries that are currently widely used include a lithium ion battery, a lithium polymer battery, a nickel cadmium battery, a nickel hydrogen battery, a nickel zinc battery, etc. The operating voltage of such a unit secondary battery cell, that is, a unit battery cell, is about 2.5 V to about 4.5 V. Accordingly, when a higher output voltage is required, a plurality of battery cells are connected in series to configure a battery pack. In addition, a plurality of battery cells are connected in parallel to configure a battery pack according to the charge/discharge capacity required for the battery pack. Accordingly, the number of battery cells included in the battery pack may be set in various ways according to a required output voltage or charge/discharge capacity.

Meanwhile, when a battery pack is configured by connecting a plurality of battery cells in series/parallel, a method of configuring the battery pack by first configuring a battery module including at least one battery cell, and adding other components using the at least one battery module is common.

The conventional battery pack is configured to include a case tray supporting a battery module and a case cover coupled to the case cover so that the battery module may be packaged.

In the case of an assembly process of the case tray and the case cover of the conventional battery pack, the edge of the case tray and the edge of the case cover face each other, and then are fastened by using a fastening member, etc. so that the case tray and the case cover are coupled to each other.

However, during such a conventional assembly process of the case tray and the case cover, due to a spring back phenomenon of the case tray and the case cover, a problem that it is difficult to have the edges face each other occurs frequently. Accordingly, there is a problem that the entire assembly process is less efficient and leads to product defects such as an erroneous assembly, etc.

Therefore, it is required to seek a solution to prevent the product defects and improve assembly properties during the assembly process of the case tray and case cover of the battery pack.

DISCLOSURE

Technical Problem

The present disclosure is designed to solve the problems of the related art, and therefore the present disclosure is directed to providing a battery pack assembly guide jig capable of improving assembly properties during an assembly process of a case tray and a case cover of a battery pack.

The present disclosure is also directed to providing a battery pack assembly guide jig capable of preventing product defects during an assembly process of a case tray and a case cover of a battery pack.

Technical Solution

In one aspect of the present disclosure, there is provided a battery pack assembly guide jig for guiding an assembly of a battery pack, wherein the battery pack assembly guide jig is configured to support a case tray and a case cover of the battery pack when the case tray and the case cover are coupled to each other.

The battery pack assembly guide jig may include a first guide configured to temporarily fix a first side edge of the case tray and a first side edge of the case cover; and a second guide spaced apart from the first guide by a predetermined distance and configured to temporarily fix a second side edge of the case tray opposite the first side edge of the case tray and a second side edge of the case cover opposite the first side edge of the case cover.

The battery pack assembly guide jig may further include a connector configured to connect the first guide and the second guide.

The first guide may be provided in a pair, and the pair of first guides may be spaced apart from each other by a predetermined distance in a height direction of the battery pack.

The second guide may be provided in a pair, and the pair of second guides may be spaced apart from each other by a predetermined distance in a height direction of the battery pack.

The connector may include a first connection member configured to connect the first guide and the second guide; and a second connection member spaced apart from the first connection member by a predetermined distance in a height direction of the battery pack and configured to connect the first guide and the second guide.

The first guide may include a first guiding body having a predetermined shape; a first tray insertion portion provided in the first guiding body and into which the first side edge of the case tray is inserted; and a first cover insertion portion provided in the first guiding body to be spaced apart from the first tray insertion portion by a predetermined distance and into which the first side edge of the case cover is inserted.

The first tray insertion portion and the first cover insertion portion have a predetermined depth extend in an up and down direction of the first guiding body.

The second guide may include a second guiding body having a predetermined shape; a second tray insertion portion provided in the second guiding body and into which the second side edge of the case tray is inserted; and a second cover insertion portion provided in the second guiding body to be spaced apart from the second tray insertion portion by a predetermined distance and into which the second side edge of the case cover is inserted.

The second tray insertion portion and the second cover insertion portion may be formed by a predetermined depth and extend in an up and down direction of the second guiding body.

A width of the first insertion cover portion may decrease from an upper portion to a lower portion of the first guiding body.

A width of the second insertion cover portion may decrease from an upper portion to a lower portion of the second guiding body.

Advantageous Effects

According to various embodiments as described above, a battery pack assembly guide jig capable of improving assembly properties during an assembly process of a case tray and a case cover of a battery pack may be provided.

In addition, according to various embodiments as described above, a battery pack assembly guide jig capable of preventing product defects during an assembly process of a case tray and a case cover of a battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

Figure 10:
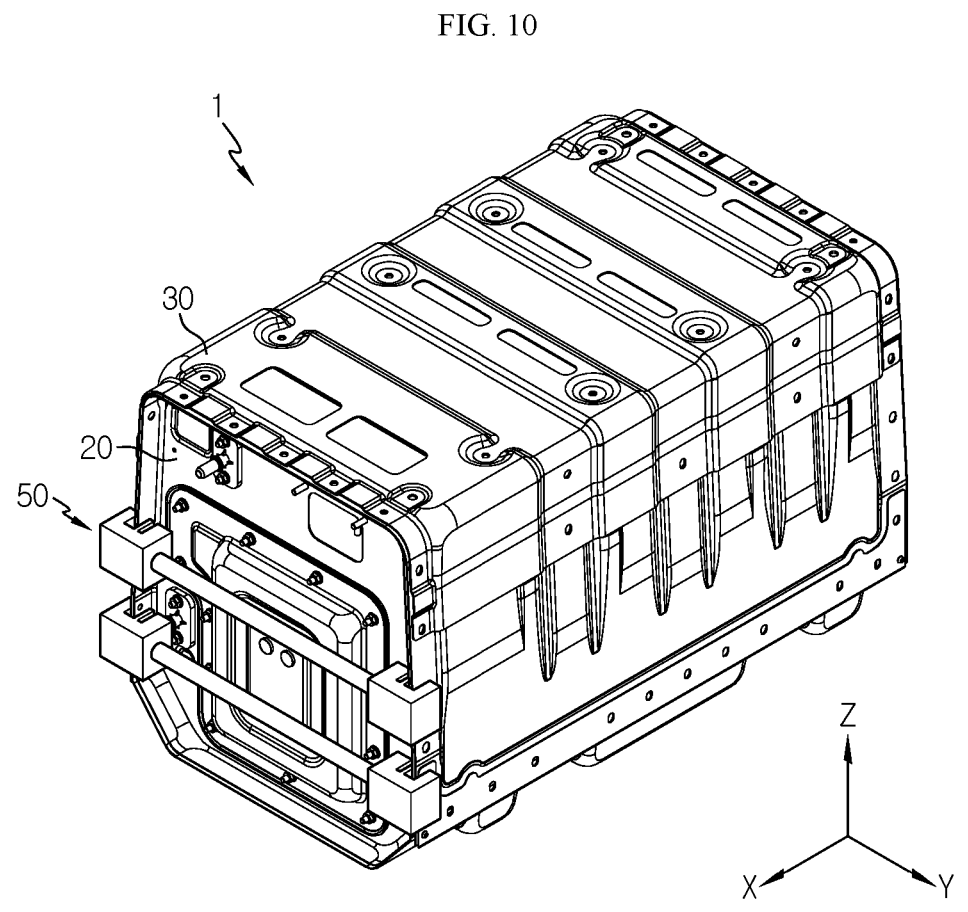

FIGS. 6 to 10 are views for explaining assembly guiding mechanism of the battery pack assembly guide jig when a case tray and a case cover of a battery pack of FIG. 1 are coupled to each other.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure. In addition, in order to help the understanding of the invention, the accompanying drawings are not shown in actual scale, but dimensions of some components may be exaggeratedly shown.

Figure 1:
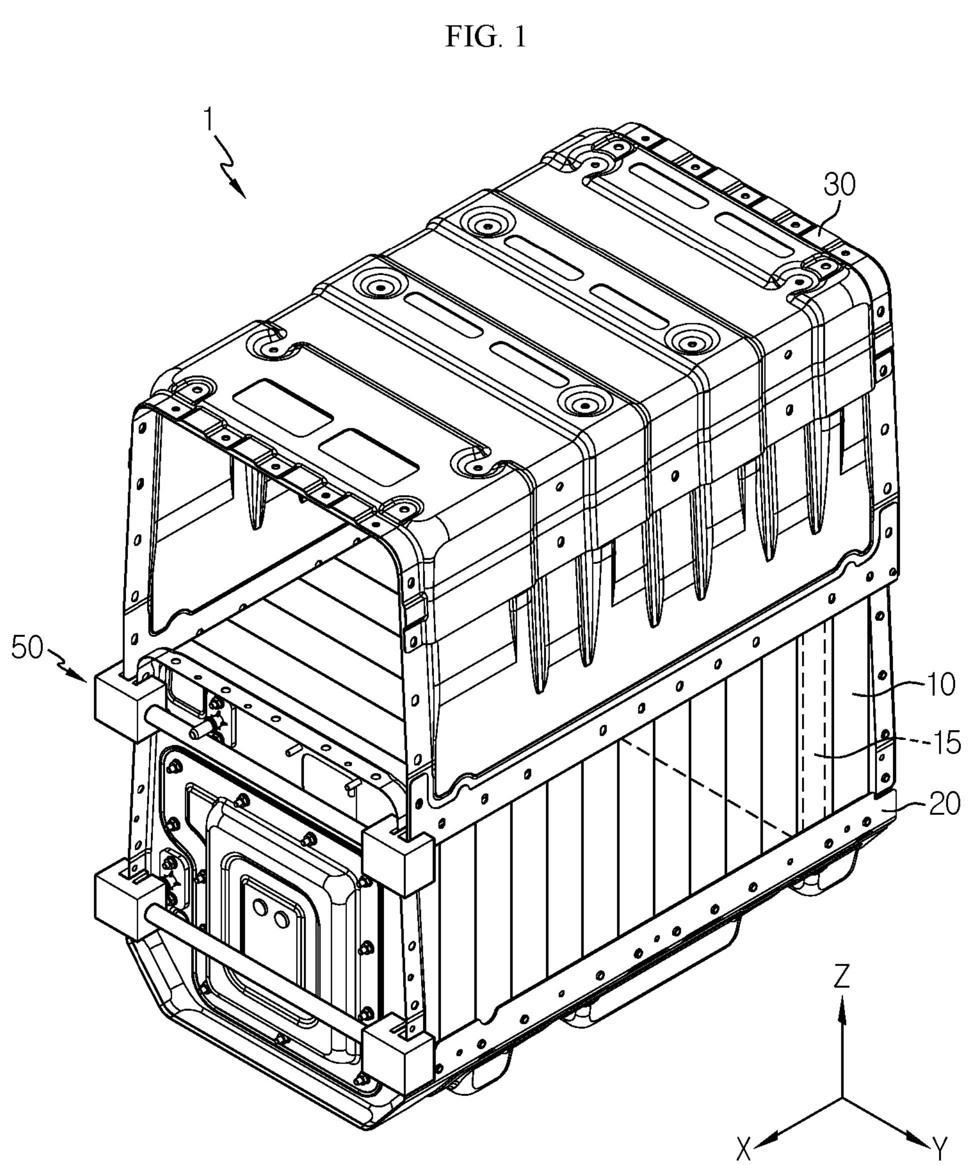
FIG. 1 is a view for explaining a battery pack and a battery pack assembly guide jig according to an embodiment of the present disclosure.

FIG. 1 is a view for explaining a battery pack and a battery pack assembly guide jig according to an embodiment of the present disclosure.

Referring to FIG. 1, a battery pack 1 may be provided, as an energy source, in a vehicle such as an electric vehicle or a hybrid vehicle. The battery pack 1 may be mounted on a body of the vehicle, and may be mounted on a lower portion of the body of the vehicle.

In addition, the battery pack 1 may be possible to be mounted on a position of the conventional oil tank in place of an oil tank. For example, in the case of an electric (EV) truck or an EV bus, the battery pack 1 may be mounted on a position of an oil tank in a previous general truck or general bus in place of an oil tank Such a battery pack 1 may be configured to include a battery module 10, a case tray 20 supporting the battery module 10, and a case cover 30 that is coupled to the case tray 20 so that the battery module 10 is packaged.

The battery module 10 may be provided in at least one or in plurality. The battery module 10 may include a battery cell 15.

The battery cell 15 may be provided in at least one or more. Such a battery cell 15 may be provided, as a secondary battery, as a pouch type secondary battery, a square type secondary battery, or a cylindrical type secondary battery. Hereinafter, in the present embodiment, the battery cell 15 will be described as being provided as a pouch type secondary battery.

The case tray 20 may support the battery module 10, and may be mounted on machine or instrument that uses the battery pack 1 as an energy source. For example, the case tray 20 may be mounted on a vehicle such as an electric vehicle.

The case cover 30 may be coupled to the case tray 20 through a fastening member, etc. so that the battery module 20 may be packaged. Such coupling of the case cover 30 and the case tray 20 through the fastening member, etc. may be performed in the edge of the case cover 30 and the edge of the case tray 20.

Upon such coupling of the case cover 30 and the case tray 20, it may be difficult to face the edges of the case cover 30 and the case tray 20 due to a spring back phenomenon. Accordingly, fastening of the fastening member, etc. is also difficult, and a problem such as an erroneous assembly may occur.

In particular, in the case of the EV truck or the EV bus, when the battery pack 1 is mounted on a position of an oil tank in a previous general truck or general bus in place of the oil tank, the assembly accuracy between the case tray 20 and the case cover 30 may be further required.

To this end, in the present embodiment, a battery pack assembly guide jig 50 for guiding the assembly of the battery pack 1 may be provided.

The battery pack assembly guide jig 50 may support the case tray 20 and the case cover 30 when the case tray 20 and the case cover 30 of the battery pack 1 are coupled to each other.

When the case tray 20 and the case cover 30 of the battery pack 1 are coupled to each other, such a battery pack assembly guide jig 50 may integrally support the case cover 30 and the case tray 20 to make the edge of the case cover 30 and the edge of the case tray 20 smoothly face and contact each other at a correct position while suppressing the spring back phenomenon of the case cover 30 and the case tray 20.

Hereinafter, the battery pack assembly guide jig 50 according to the present embodiment will be described in more detail.

Figure 2:
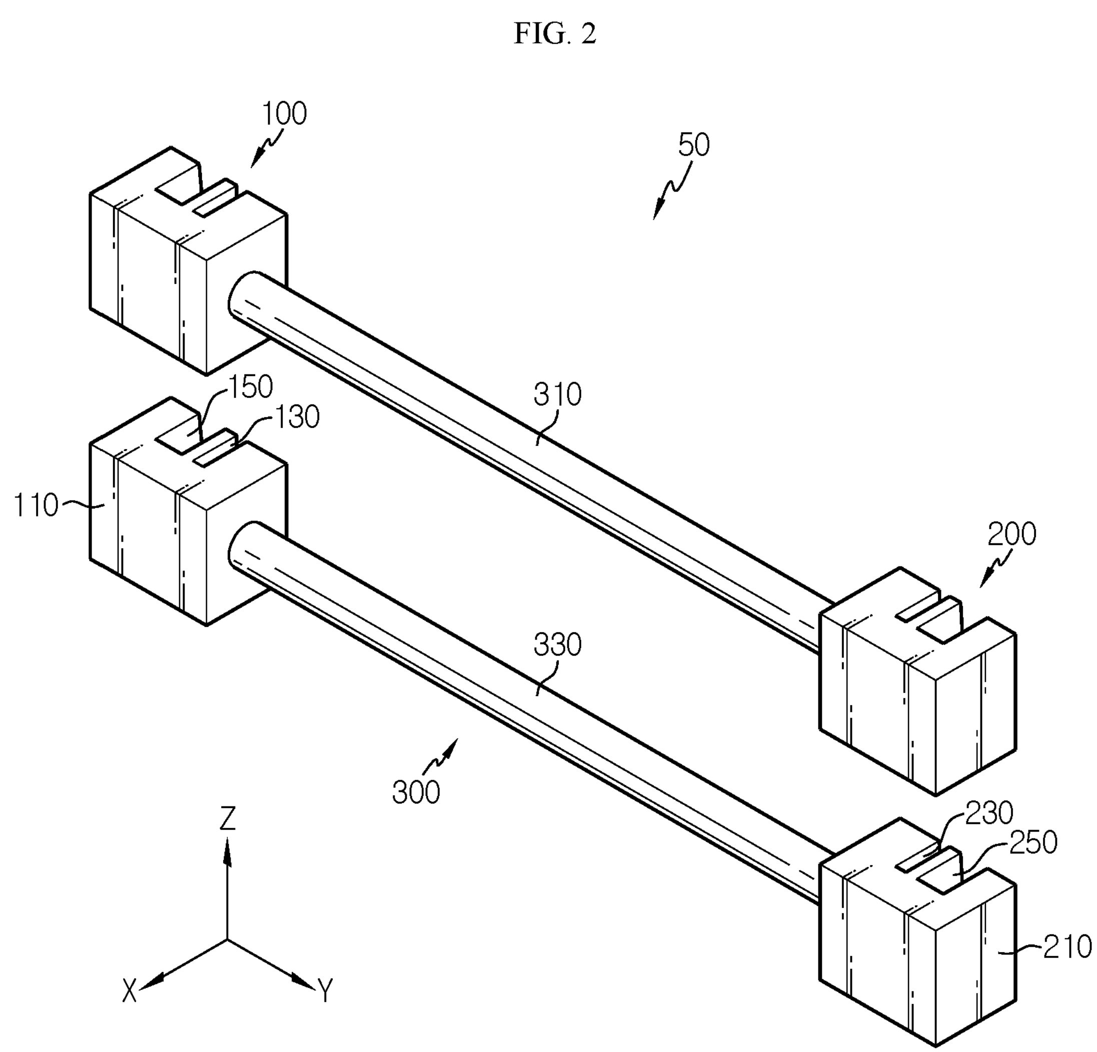
FIG. 2 is a front perspective view of the battery pack assembly guide jig of FIG. 1.
Figure 3:
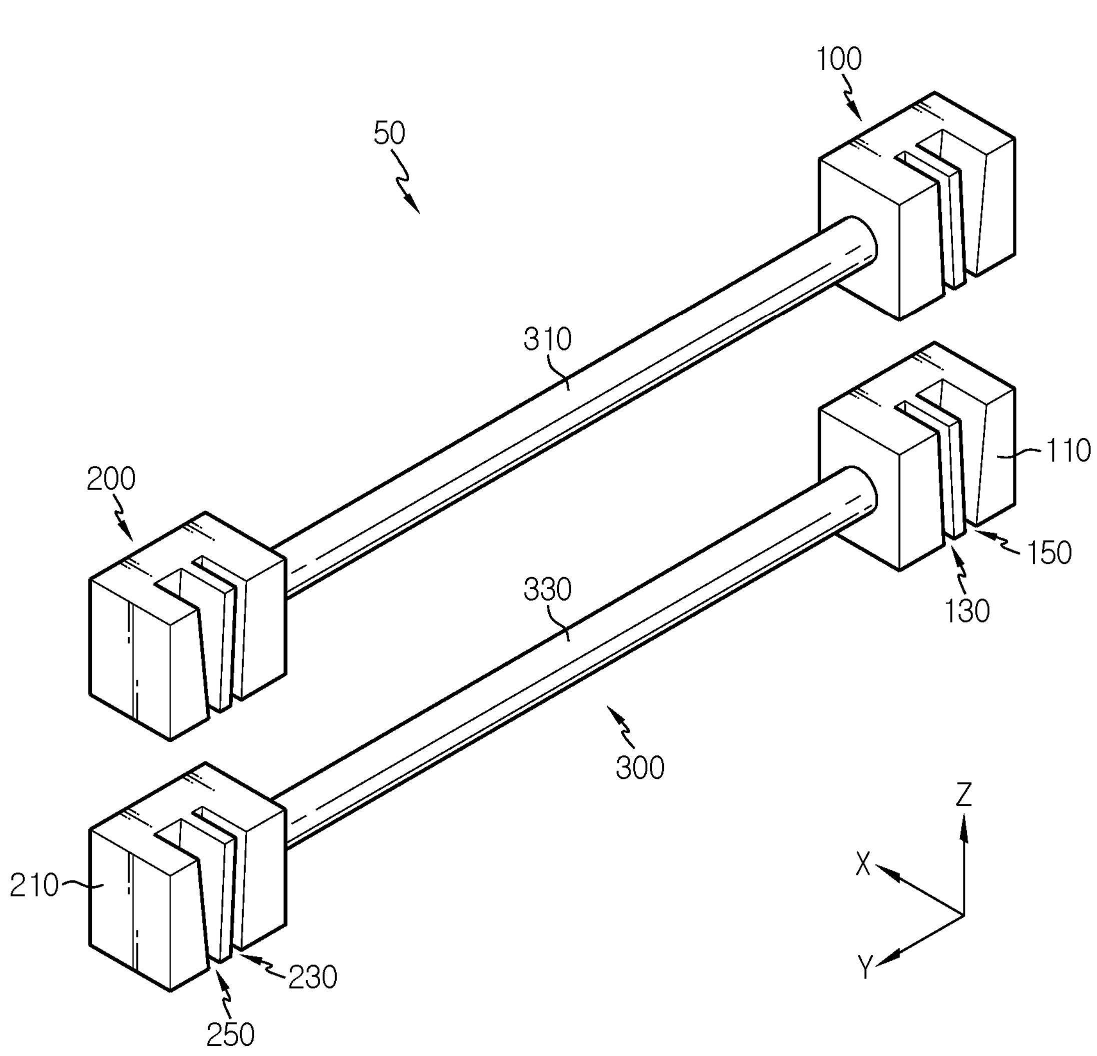
FIG. 3 is a rear perspective view of the battery pack assembly guide jig of FIG. 2.
Figure 4:
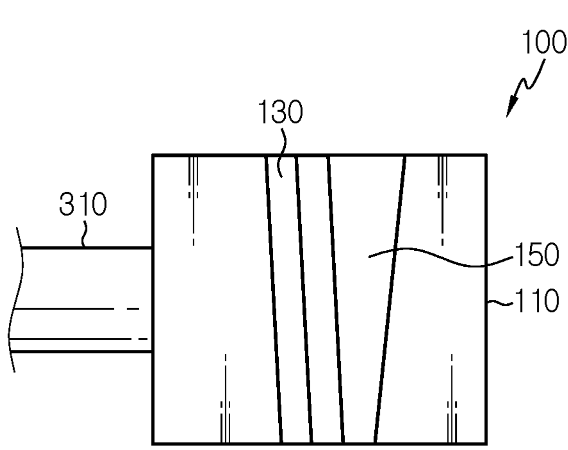
FIG. 4 is a view for explaining a first guiding unit of the battery pack assembly guide jig of FIG. 2.
Figure 4:
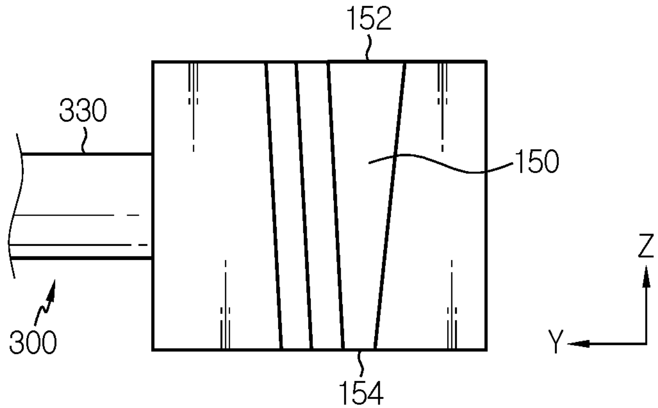
Figure 5:
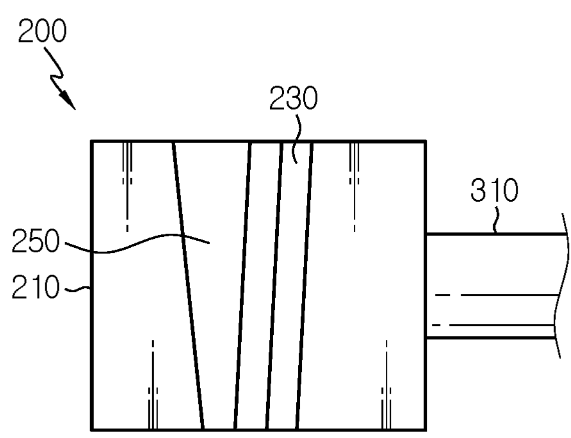
FIG. 5 is a view for explaining a second guiding unit of the battery pack assembly guide jig of FIG. 2.
Figure 5:
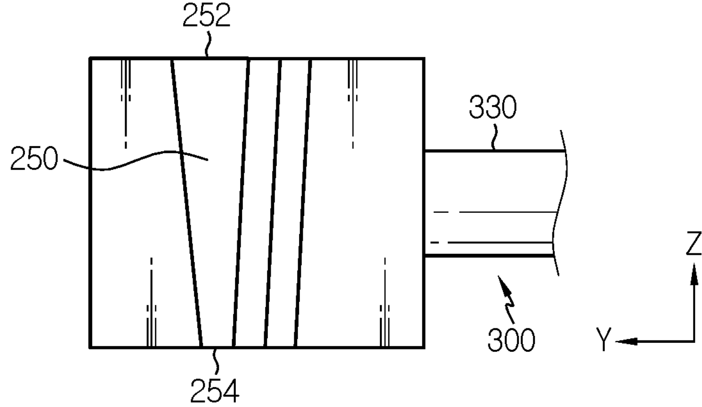
Figure 6:
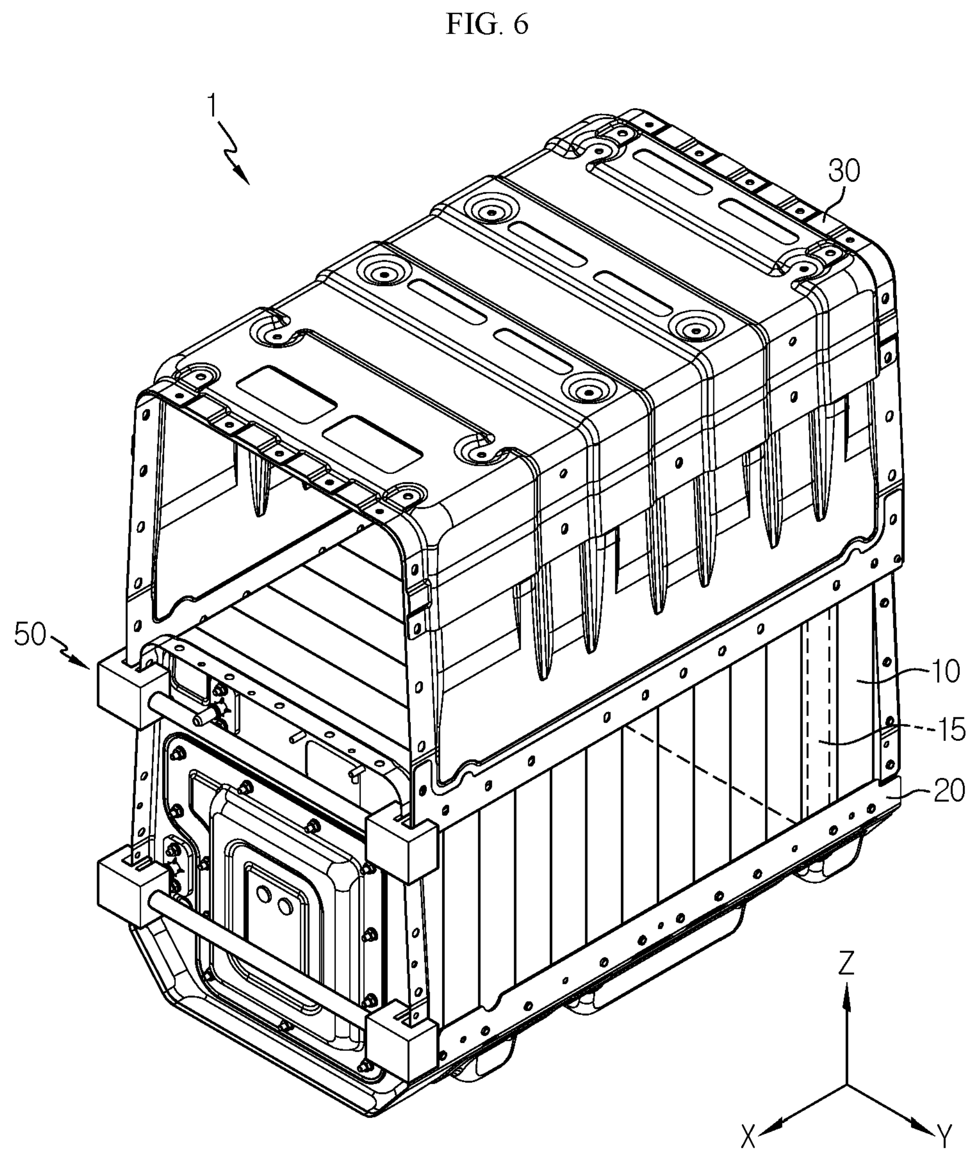
Figure 7:
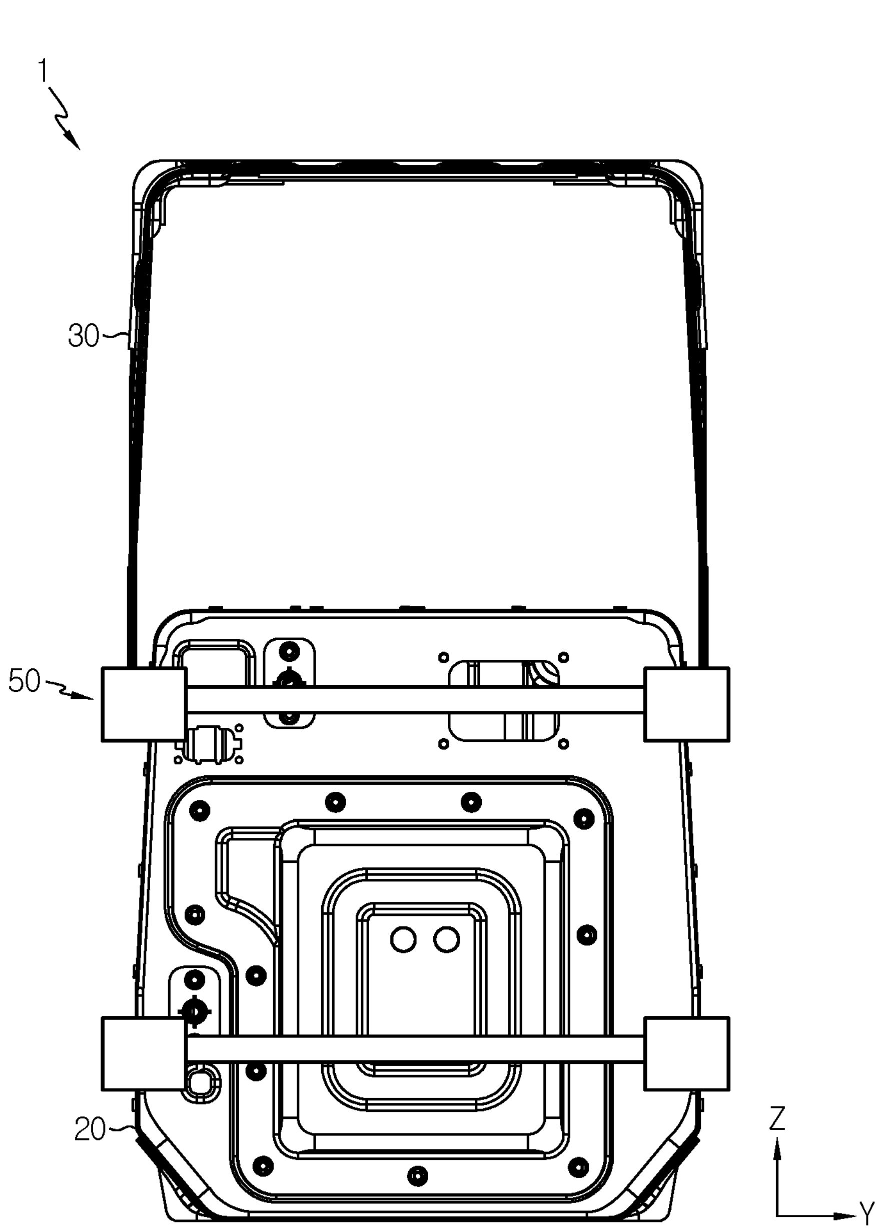
Figure 8:
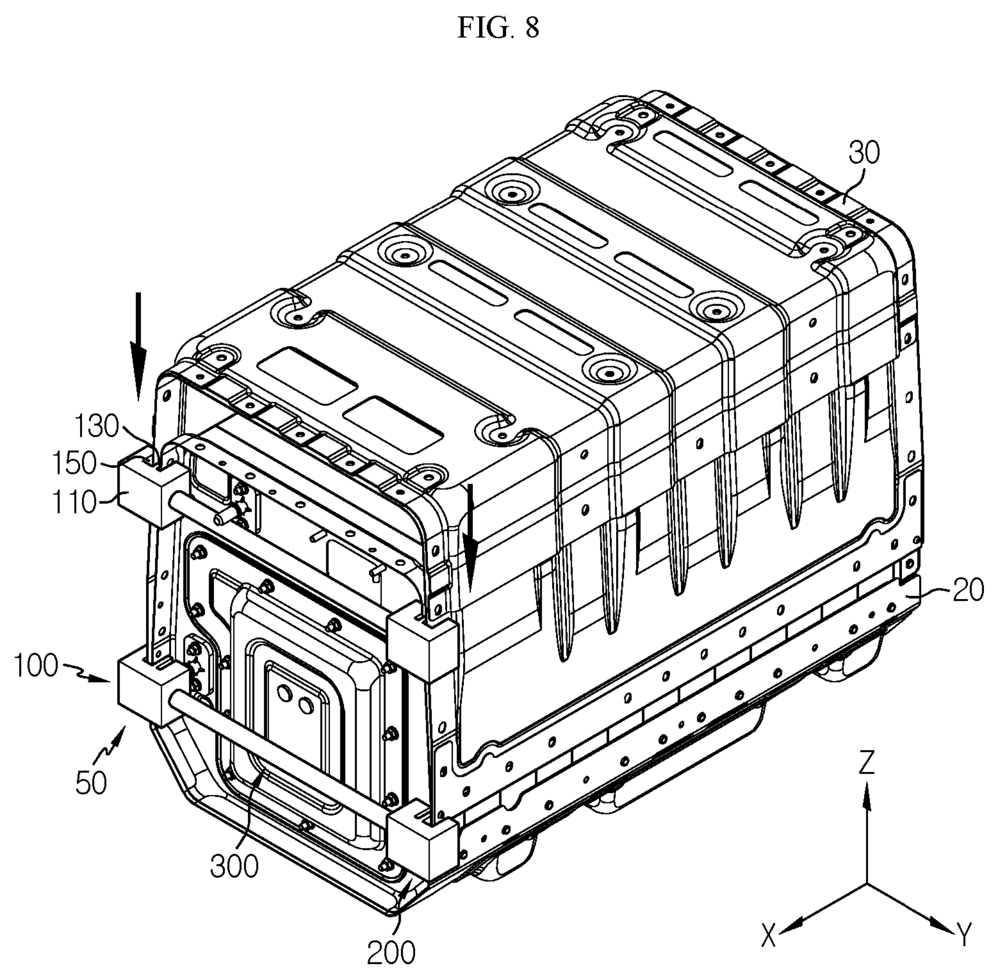
Figure 9:
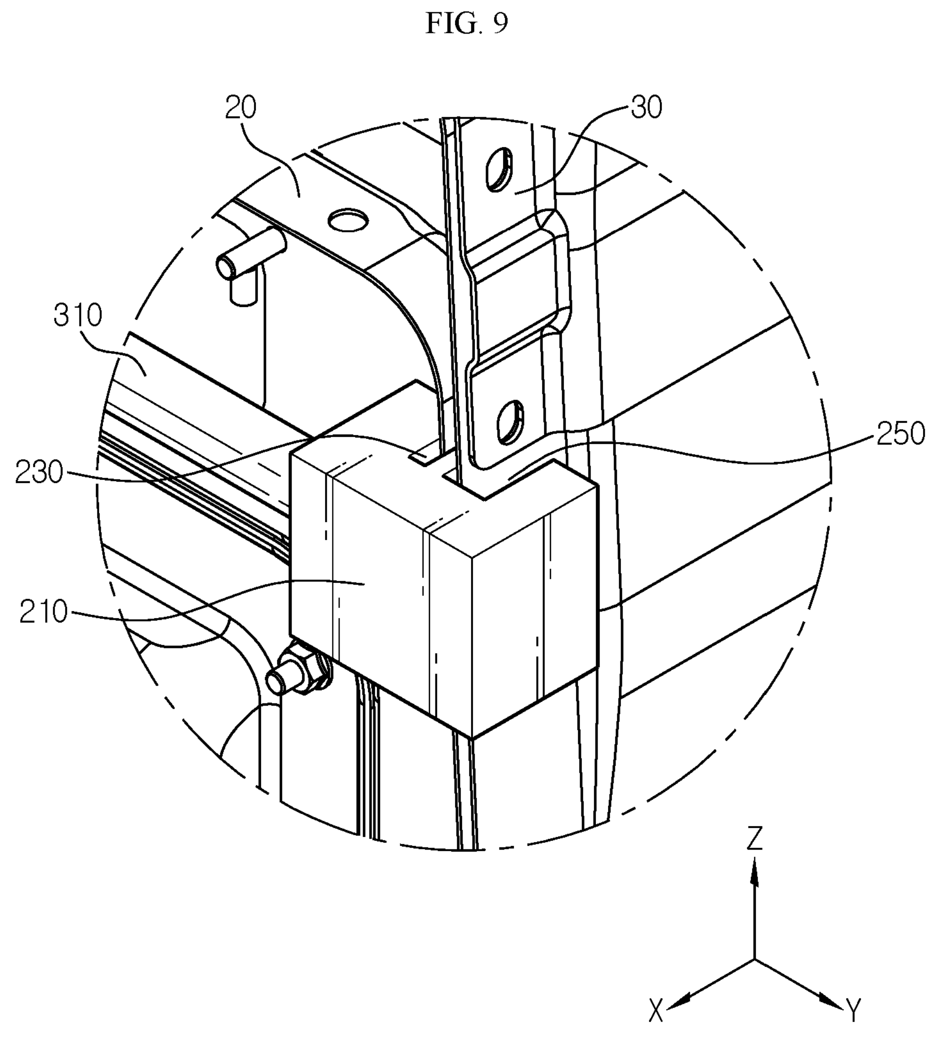

FIG. 2 is a front perspective view of the battery pack assembly guide jig of FIG. 1, FIG. 3 is a rear perspective view of the battery pack assembly guide jig of FIG. 2, FIG. 4 is a view for explaining a first guiding unit of the battery pack assembly guide jig of FIG. 2, and FIG. 5 is a view for explaining a second guiding unit of the battery pack assembly guide jig of FIG. 2.

Referring to FIGS. 2 to 5, the battery pack assembly guide jig 50 may include a first guiding unit 100 and a second guiding unit 200.

The first guiding unit 100 may temporarily fix one side edge (−Y-axis direction) of the case tray 20 (see FIG. 1) and one side edge (−Y-axis direction) of the case cover 30 (see FIG. 1).

Such a first guiding unit 100 may be provided as a pair.

The pair of first guiding units 100 may be disposed to be spaced apart from each other by a predetermined distance in a height direction (Z-axis direction) of the battery pack 1 (see FIG. 1).

In the present embodiment, the first guiding unit 100 may temporarily fix the case tray 20 (see FIG. 1) and the case cover 30 (see FIG. 1) in up and down direction in the height direction (Z-axis direction) of the battery pack 1, thereby securing a more stable bearing capacity.

Such a pair of first guiding units 100 may include, respectively, a first guiding body 110, a first tray insertion portion 130, and a first cover insertion portion 150.

The first guiding body 110 may have a predetermined shape and may be provided in an approximately hexahedral shape. This is only an example, and the shape of the first guiding body 110 may be provided in other shapes as long as the first guiding unit 100 may temporarily fix the edge of the case tray 20 and the edge of the case cover 30.

The first tray insertion portion 130 may be provided in the first guiding body 100, and one side edge (−Y-axis direction) of the case tray 20 may be inserted therein. Such a first tray insertion portion 130 may be formed by a predetermined depth from a rear surface (−X-axis direction) of the first guiding body 110, and may be formed long in the up and down direction (Z-axis direction) of the first guide body 110.

The first cover inserting portion 150 may be provided in the first guiding body 110 to be spaced apart from the first tray inserting portion 130 by a predetermined distance, and one side edge of the case cover 30 (−Y-axis direction) may be inserted therein.

Such a first cover insertion portion 150 may be formed by a predetermined depth from the rear surface (−X-axis direction) of the first guiding body 110, and may be formed long in the up and down direction (Z-axis direction) of the first guide body 110.

An upper end 152 (+Z-axis direction) of the first cover insertion portion 150 may be formed to have a larger width than that of a lower end 154 (−Z-axis direction) of the first cover inserting portion 150. Accordingly, the first cover insertion portion 150 may be provided to have a width tapered from an upper side to a lower side in the height direction (Z-axis direction) the first cover insertion portion 150.

The second guiding unit 200 may be spaced apart from the first guiding unit 100 by a predetermined distance, and may temporarily fix the other side edge (+Y-axis direction) of the case tray 20 and the other side edge (+Y-axis direction) of the case cover 30.

The pair of second guiding units 200 may be disposed to be spaced apart from each other by a predetermined distance in the height direction (Z-axis direction) of the battery pack 1 (see FIG. 1).

In the present embodiment, the second guiding unit 200 may temporarily fix the case tray 20 (see FIG. 1) and the case cover 30 (see FIG. 1) in the up and down direction in the height direction (Z-axis direction) of the battery pack 1, thereby securing a more stable bearing capacity.

Such a pair of second guiding units 200 may include, respectively, a second guiding body 210, a second tray insertion portion 230, and a second cover insertion portion 250.

The second guiding body 210 may have a predetermined shape, and may be provided in an approximately hexahedral shape. This is only an example, and the shape of the second guiding body 210 may be provided in other shapes as long as the second guiding body 210 may temporarily fix the edge of the case tray 20 and the edge of the case cover 30.

The second tray insertion portion 230 may be provided in the second guiding body 100, and the other side edge (+Y-axis direction) of the case tray 20 may be inserted therein.

Such a second tray insertion portion 230 may be formed by a predetermined depth from a rear surface (−X-axis direction) of the second guiding body 210, and may be formed long in the up and down direction (Z-axis direction) of the second guide body 210.

The second cover insertion portion 250 may be provided on the second guiding body 210 to be spaced apart from the second tray insertion portion 230 by a predetermined distance, and the other side edge (+Y-axis direction) of the case cover 30 may be inserted therein.

The second cover insertion portion 250 may be formed by a predetermined depth from the rear surface (−X-axis direction) of the second guiding body 210, and may be formed long in the up and down direction (Z-axis direction) of the second guide body 210.

An upper end 252 (+Z-axis direction) of the second cover insertion portion 250 may be formed to have a larger width than that of a lower end 254 (−Z-axis direction) of the second cover insertion portion 250. Accordingly, the second cover insertion portion 250 may be provided to have a width tapered from an upper side to a lower side in the height direction (Z-axis direction) of the second cover insertion portion 250.

The battery pack assembly guide jig 50 may include a connection unit 300.

The connection unit 300 may have a predetermined length, and may connect the first guiding unit 100 and the second guiding unit 200.

Such a connection unit 300 may include a first connection member 310 and a second connection member 330.

The first connection member 310 may be formed by a predetermined length and may connect the first guiding unit 100 and the second guiding unit 200. Such a first connection member 310 may be mounted on the first guiding body 110 of the first guiding unit 100 and the second guiding body 210 of the second guiding unit 200 disposed on the upper side in the height direction (Z-axis direction) of the battery pack 1.

The second connection member 330 may be formed by a predetermined length, may be spaced apart from the first connection member 310 by a predetermined distance in the height direction (Z-axis direction) of the battery pack 1, and may connect the first guiding unit 100 and the second guiding unit 200 to each other.

Such a second connection member 330 may be mounted on the first guiding body 110 of the first guiding unit 100 and the second guiding body 210 of the second guiding unit 200 disposed on the lower side in the height direction (Z-axis direction) of the battery pack 1.

Hereinafter, detailed assembly guiding mechanism of the battery pack assembly guide jig 50 according to the present embodiment will be described in more detail.

FIGS. 6 to 10 are views for explaining assembly guiding mechanism of the battery pack assembly guide jig when a case tray and a case cover of the battery pack of FIG. 1 are coupled to each other.

Referring to FIGS. 6 to 10, a manufacturer, etc. may make the battery module 10 seated in the case tray 20 of the battery pack 1 and then couple the case cover 30 with the case tray 20 for packaging of the battery module 10.

In a coupling process of the case tray 20 and the case cover 30, first, the battery pack assembly guide jig 50 may be temporarily fixed to the case tray 20.

Specifically, one side edge (−Y-axis direction) and the other side edge (+Y-axis direction) of the case tray 20 may be respectively inserted into the first guiding unit 100 and the second guiding unit 200 of the battery pack assembly guide jig 50.

More specifically, one side edge (−Y-axis direction) of the case tray 20 may be inserted into a first tray insertion groove 130 of the first guiding unit 100, and the other side edge (+Y-axis direction) of the case tray 20 may be inserted into a second tray insertion groove 230 of the second guiding unit 200.

Thereafter, in the up and down direction (Z-axis direction) of the battery pack 1, the case cover 30 may slide downward (−Z-axis direction) toward the case tray 20.

According to the downward (−Z-axis direction) sliding of the case cover 30, one side edge (−Y-axis direction) and the other side edge (+Y-axis direction) of the case cover 30 may be respectively inserted into and temporarily fixed to the first guiding unit 100 and the second guiding unit 200 of the battery pack assembly guide jig 50.

More specifically, one side edge (−Y-axis direction) of the case cover 30 may be inserted into a first cover insertion groove 150 of the first guiding unit 100, and the other side edge (+Y-axis direction) of the case cover 30 may be inserted into a second cover insertion groove 250 of the second guiding unit 200.

In the case of the first cover insertion groove 150 and the second cover insertion groove 250, since the upper end has a large width than the lower end, according to the downward (−Z-axis direction) sliding of the case cover 30, when both edges of the case cover 30 are respectively inserted into the first cover insertion groove 150 and the second cover insertion groove 250, a problem such as non-insertion or an erroneous insertion may be effectively prevented.

In addition, each of the first cover insertion groove 150 and the second cover insertion groove 250 has a width tapered toward the lower end, thereby temporarily fixing and supporting the edge of the case cover 30 more firmly than the downward (−Z-axis direction) sliding after insertion of the case cover 30.

When the downward (−Z-axis direction) sliding of the case cover 30 is completed, the manufacturer, etc., may mutually fasten the edges of the case cover 30 and the case tray 20 by using a fastening member, etc.

In the present embodiment, upon fastening of such a fastening member, etc., the battery pack assembly guide jig

50 integrally fixes and support the edge of the case tray 20 and the edge of the case cover 30, thereby remarkably increasing the fastening accuracy of the fastening member, etc.

When the coupling of the case tray 20 and the case cover 30 through the fastening member, etc. is completed, the manufacturer, etc. may separate the battery pack assembly guide jig 50 from the case tray 20 and the case cover 30.

Thereafter, the manufacturer, etc. may guide the battery pack 10 to a next manufacturing process, etc. to proceed with a subsequent manufacturing process.

As such, when the case tray 20 and the case cover 30 of the battery pack 10 are coupled to each other, the battery pack assembly guide jig 50 according to the present embodiment may temporarily fix and support the edge of the case tray 20 and the edge of the case cover 30 more stably, thereby effectively suppressing a spring back phenomenon of the case tray 20 and the case cover 30.

Accordingly, in the present embodiment, through the battery pack assembly guide jig 50, when the case tray 20 and the case cover 30 are coupled to each other, it is possible to effectively guide the edges of the case tray 20 and the case cover 30 to face each other.

Therefore, in the present embodiment, through the battery pack assembly guide jig 50, the fastening accuracy through the fastening member, etc. may be increased, and the entire assembly process time may also be significantly shortened.

Figure 11:
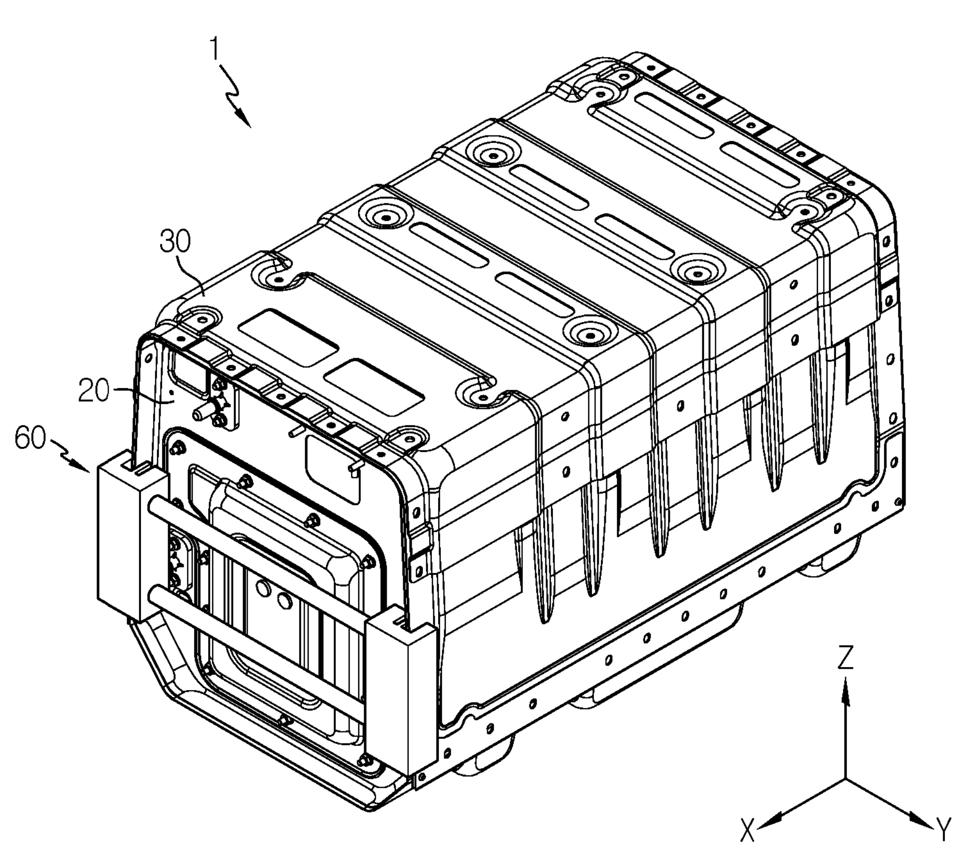
FIG. 11 is a view for explaining a battery pack assembly guide jig according to another embodiment of the present disclosure.
Figure 12:
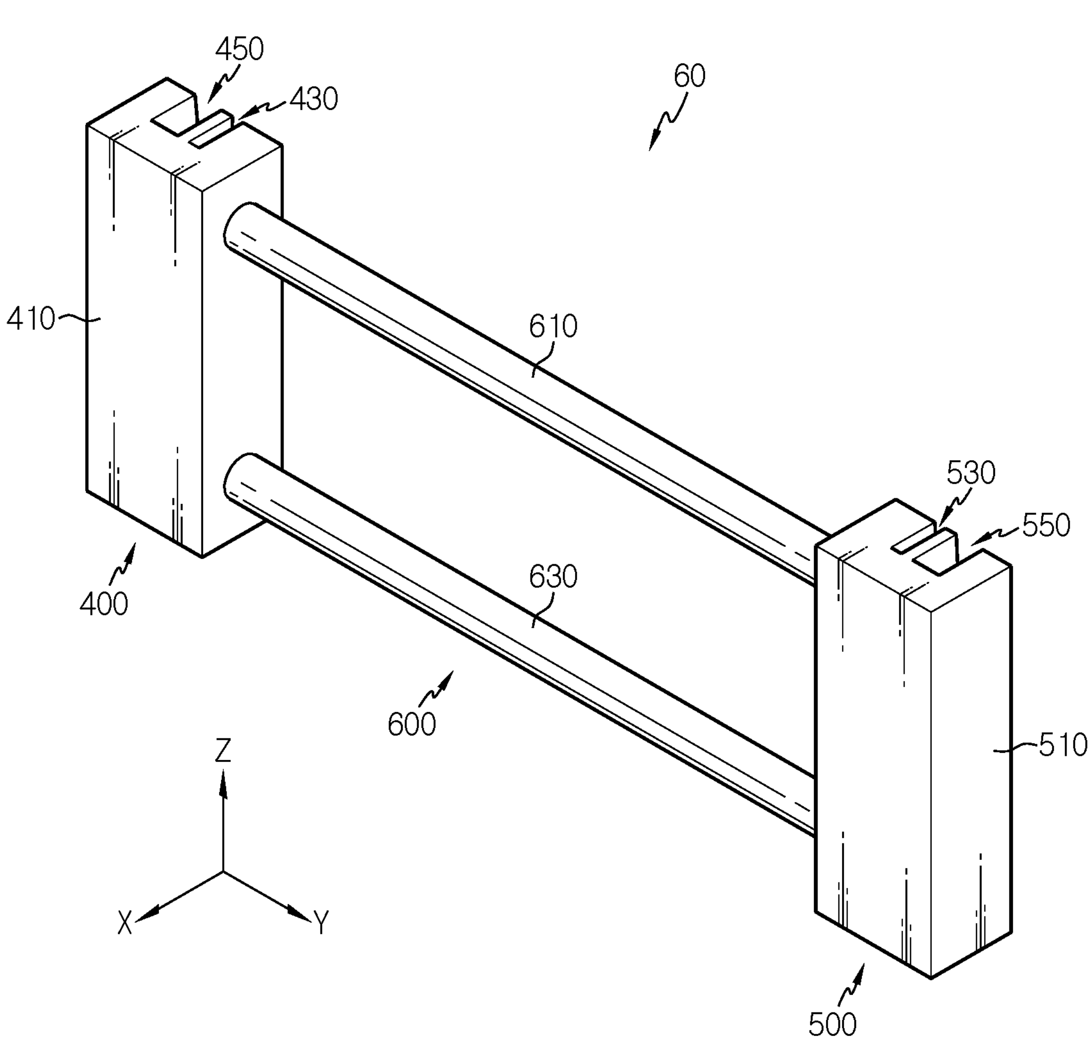
FIG. 12 is a front perspective view of the battery pack assembly guide jig of FIG. 11.
Figure 13:
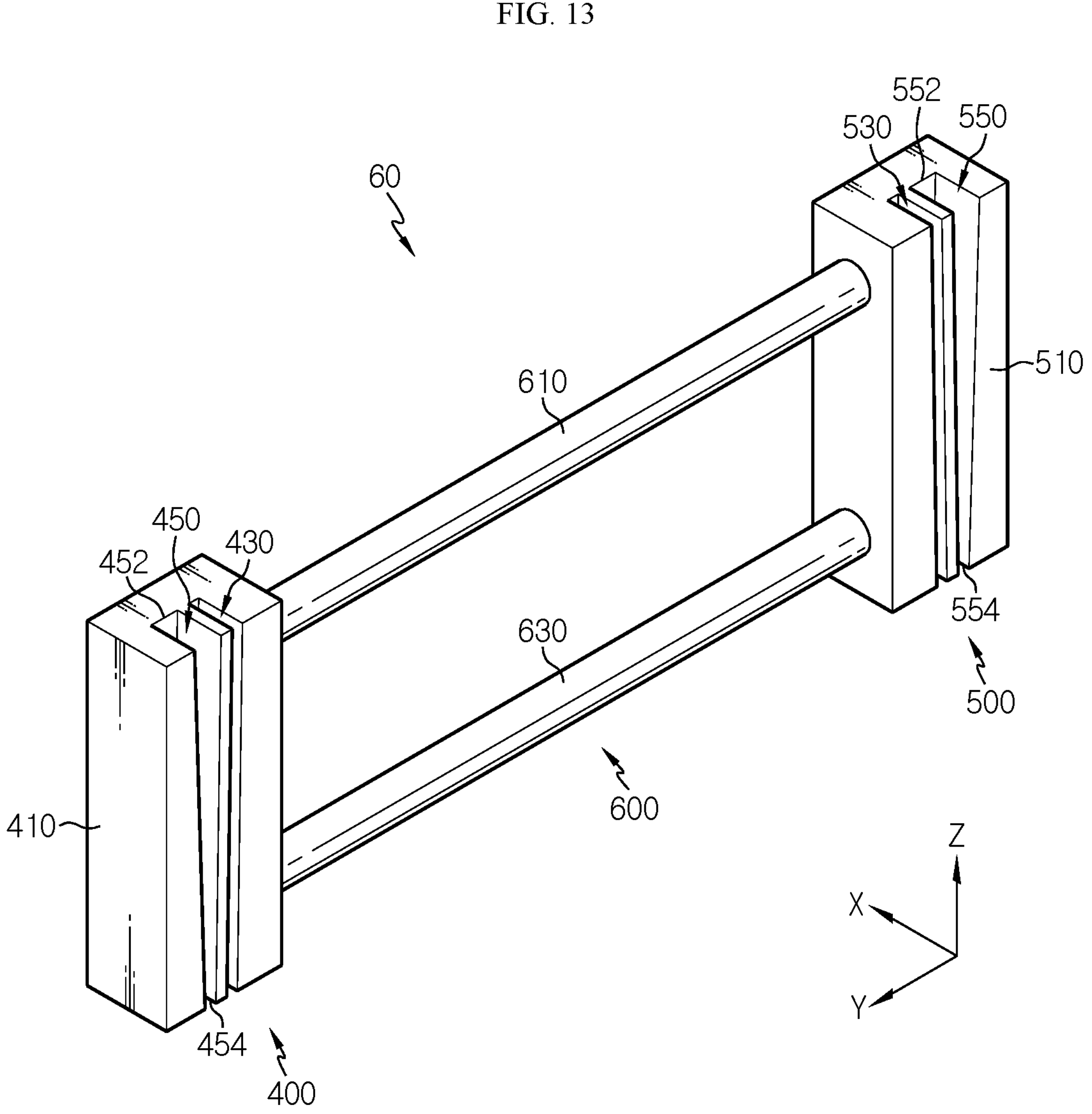
FIG. 13 is a rear perspective view of the battery pack assembly guide jig of FIG. 12.

FIG. 11 is a view for explaining a battery pack assembly guide jig according to another embodiment of the present disclosure, FIG. 12 is a front perspective view of the battery pack assembly guide jig of FIG. 11, and FIG. 13 is a rear perspective view of the battery pack assembly guide jig of FIG. 12.

The battery pack assembly guide jig 60 according to the present embodiment is similar to the battery pack assembly guide jig 50 of the previous embodiment, and thus redundant descriptions of components that are substantially the same as or similar to those of the previous embodiment are omitted. Hereinafter, differences between the present embodiment and the previous embodiment will be mainly described.

Referring to FIGS. 11 to 13, the battery pack assembly guide jig 60 may include a first guiding unit 400, a second guiding unit 500, and a connection unit 600.

The first guiding unit 400, unlike the previous embodiment, may be provided as a single member rather than a pair.

The first guiding unit 400 may include a first guiding body 410, a first tray insertion portion 430, and a first cover insertion portion 450.

The first guiding body 410 may be formed to have a longer length in the height direction (Z-axis direction) of the battery pack assembly guide jig 60 than that of the first guiding body 110 of the previous embodiment. This is to more stably support the case tray 20 and the case cover 30 when the case tray 20 and the case cover 30 of the battery pack 1 are coupled to each other.

Accordingly, the first tray insertion portion 430 and the first cover insertion portion 450 may have longer lengths than those of the first tray insertion portion 130 and the first cover insertion portion 150 of the previous embodiment.

Meanwhile, an upper end 452 (+Z-axis direction) of the first cover insertion portion 450 may have a larger width than that of a lower end 454 (−Z-axis direction) of the first cover insertion portion 450 as in the previous embodiment.

The second guiding unit 500 may include a second guiding body 510, a second tray insertion portion 530, and a second cover insertion portion 550.

The second guiding body 510 may be formed to have a longer length in the height direction (Z-axis direction) of the battery pack assembly guide jig 60 than that of the second guiding body 210 of the previous embodiment. This is to more stably support the case tray 20 and the case cover 30 when the case tray 20 and the case cover 30 of the battery pack 1 are coupled to each other.

Accordingly, the second tray insertion portion 530 and the second cover insertion portion 550 may have longer lengths than those of the second tray insertion portion 230 and the second cover insertion portion 250 of the previous embodiment.

Meanwhile, an upper end 552 (+Z-axis direction) of the second cover insertion portion 550 may have a larger width than that of a lower end 554 (−Z-axis direction) of the second cover insertion portion 550, as in the previous embodiment.

The connection unit 600 may include a first connection member 610 and a second connection member 630.

The first connection member 610 and the second connection member 630 are similar to those of the previous embodiment, and thus redundant descriptions thereof will be omitted below.

As such, in the battery pack assembly guide jig 60 according to the present embodiment, unlike the previous embodiment, the first guiding unit 400 and the second guiding unit 500 may be provided as a single member.

Accordingly, in the present embodiment, the battery pack assembly guide jig 60 may reduce manufacturing cost or time, thereby securing cost competitiveness of the battery pack assembly guide jig 60.

According to various embodiments as described above, during the assembly process of the case tray 20 and the case cover 30 of the battery pack 1, the battery pack assembly guide jigs 50 and 60 capable of improving assembly properties may be provided.

In addition, according to various embodiments as described above, during the assembly process of the case tray 20 and the case cover 30 of the battery pack 1, the battery pack assembly guide jigs 50 and 60 capable of preventing product defects may be provided.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack assembly guide jig for guiding an assembly of a battery pack, the battery pack assembly guide jig being configured to support a case tray and a case cover of the battery pack when the case tray and the case cover are coupled to each other, the battery pack assembly guide jig comprising:

a first guide configured to temporarily fix a first side edge of the case tray and a first side edge of the case cover, the first guide having:

a first guiding body having a predetermined shape;

a first tray insertion portion provided in the first guiding body and into which the first side edge of the case tray is insertable, the first tray insertion portion being a first groove in the first guiding body; and a first cover insertion portion provided in the first guiding body to be spaced apart from the first tray insertion portion by a predetermined distance and into which the first side edge of the case cover is insertable, the first cover insertion portion being a second groove in the first guiding body and arranged parallel to the first tray insertion portion; and a second guide spaced apart from the first guide by a predetermined distance and configured to temporarily fix a second side edge of the case tray opposite the first side edge of the case tray and a second side edge of the case cover opposite the first side edge of the case cover.

2. The battery pack assembly guide jig of claim 1, further comprising a connector configured to connect the first guide and the second guide.

3. The battery pack assembly guide jig of claim 2, wherein the first guide is provided in a pair, and wherein the pair of first guides are spaced apart from each other by a predetermined distance in a height direction of the battery pack.

4. The battery pack assembly guide jig of claim 2, wherein the second guide is provided in a pair, and wherein the pair of second guides are spaced apart from each other by a predetermined distance in a height direction of the battery pack.

5. The battery pack assembly guide jig of claim 2, wherein the connector comprises:

a first connection member configured to connect the first guide and the second guide; and a second connection member spaced apart from the first connection member by a predetermined distance in a height direction of the battery pack and configured to connect the first guide and the second guide.

6. The battery pack assembly guide jig of claim 2, wherein the first tray insertion portion and the first cover insertion portion have a predetermined depth and extend in an up and down direction of the first guiding body.

7. The battery pack assembly guide jig of claim 2, wherein the second guide comprises:

a second guiding body having a predetermined shape;

a second tray insertion portion provided in the second guiding body and into which the second side edge of the case tray is insertable, the second tray insertion portion being a first groove in the second guiding body; and a second cover insertion portion provided in the second guiding body to be spaced apart from the second tray insertion portion by a predetermined distance and into which the second side edge of the case cover is insertable, the second cover insertion portion being a second groove in the second guiding body and arranged parallel to the second tray insertion portion.

8. The battery pack assembly guide jig of claim 7, wherein the second tray insertion portion and the second cover insertion portion have a predetermined depth and extend in an up and down direction of the second guiding body.

9. The battery pack assembly guide jig of claim 3, wherein the second guide is provided in a pair, and wherein the pair of second guides are spaced apart from each other by a predetermined distance in a height direction of the battery pack.

10. The battery pack assembly guide jig of claim 6, wherein a width of the first cover insertion portion decreases from an upper portion to a lower portion of the first guiding body.

11. The battery pack assembly guide jig of claim 8, wherein a width of the second cover insertion portion decreases from an upper portion to a lower portion of the second guiding body.

* * * * *